United States Patent [19]

Kaiser et al.

[11] Patent Number: 4,731,094
[45] Date of Patent: Mar. 15, 1988

[54] DYE MIXTURES

[75] Inventors: Helga Kaiser, Efringen-Kirchen, Fed. Rep. of Germany; Hans-Jörg Angliker, Reinach; Peter E. Eugster, Aesch, both of Switzerland

[73] Assignee: Ciba-Geigy Corporation, Ardsley, N.Y.

0

[21] Appl. No.: 33,322

[22] Filed: Apr. 1, 1987

[30] Foreign Application Priority Data

Apr. 4, 1986 [CH] Switzerland .......................... 1319/86

[51] Int. Cl.⁴ .............................................. C09B 67/22
[52] U.S. Cl. ........................................... 8/639; 8/690; 8/692; 8/922
[58] Field of Search ............................................. 8/639

[56] References Cited

U.S. PATENT DOCUMENTS 0083553 7/1983 EPX European Pat. Off. .
61-163968 7/1986 JPX .

Primary Examiner—
Assistant Examiner—Isabelé Rodriguez
Attorney, Agent, or Firm—Edward McC. Roberts; Meredith C. Findlay

[57] ABSTRACT

Mixtures comprising 75 to 99% by weight of a dye of formula

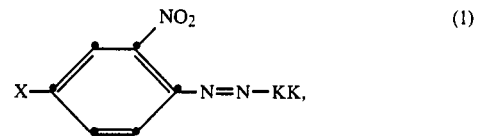

wherein
X is hydrogen, chlorine, bromine or methyl, and
KK is the radical of a coupling component that does not contain water solubilizing groups, and 1 to 25% by weight of a dye of formula

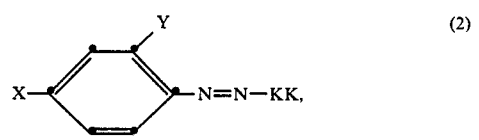

wherein X and KK have the given meanings and Y is chlorine or bromine, are suitable for dyeing polyester materials.

20 Claims, No Drawings

Microfiche Appendix Included
(Lieberman; Paul Microfiche, Pages)

DYE MIXTURES

The present invention relates to novel dye mixtures, to their preparation, and to the use thereof for dyeing and printing textile materials.

Dyes of the formula

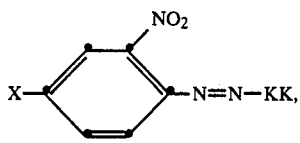

wherein X is hydrogen, chlorine, bromine or methyl, and KK is the radical of a coupling component that does not contain water solubilising groups, are known.

Also known are dyes of formula

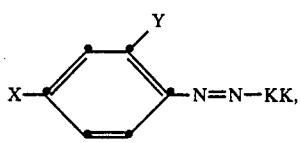

wherein X and KK are as defined above and Y is chlorine or bromine. These dyes of formula (2) require a relatively complicated synthesis and exhibit undesirable catalytic fading.

Surprisingly, it has now been found that mixtures comprising 75 to 99% by weight of a dye of formula (1) and 1 to 25% by weight of a dye of formula (2) exhaust better on to the fibres than the individual dyes and, in addition, do not exhibit catalytic fading or do so only within the limits of tolerance.

Specifically, the present invention relates to mixtures comprising 75 to 99% by weight of a dye of formula

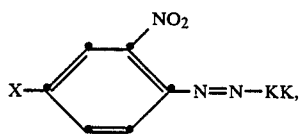

wherein
X is hydrogen, chlorine, bromine or methyl, and
KK is the radical of a coupling component that does not contain water solubilising groups,
and 1 to 25% by weight of a dye of formula

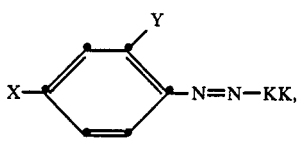

wherein X and KK have the given meanings and Y is chlorine or bromine.

Preferred dye mixtures comprise 85 to 95% by weight of a dye of formula (1) and 5 to 15% by weight of a dye of formula (2).

The preferred meaning of X is hydrogen, with the most preferred meaning being chlorine.

Suitable coupling components KK are the customary coupling components of azo chemistry which are known from the relevant literature, provided they contain no water solubilising groups, i.e. no ionic groups, e.g. no sulfo, carboxyl or quaternary ammonium groups (coupling components for disperse azo dyes).

Exemplary of the multiplicity of such coupling components are: coupling components of the benzene and naphthalene series, of open-chain components containing active methylene groups (e.g. acylacetarylamides), and of the heterocyclic series. The heterocyclic coupling components are prefered.

Typical examples of radicals of coupling components KK are radicals of the series of acylacetarylamides, phenols, pyridones, quinolines, pyrazoles, indoles diphenylamines, anilines, aminopyridines, pyrimidines, pyrimidones, naphthols, naphthylamines, aminothiazoles, thiophenes or hydroxypyridines.

Preferred radicals KK are those of the series of acetoacetanilides, phenols, anilines, diphenylamines, naphthylamines, naphthols, indoles, quinolines, pyridones, pyrazoles, quinolones, aminopyridines, especially 2,6-diaminopyridines, with the cited heterocyclic coupling components being preferred, in particular those of the series of the aminopyrazoles, pyrazolones or, most preferably, of the pyridones.

The aminopyrazoles and pyrazolones are preferably those of formula

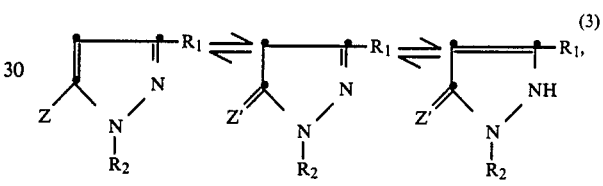

wherein Z is OH or $NH_2$, Z' is 0 or NH, $R_2$ is H, $C_1$-$C_4$alkyl, alkenyl, cycloalkyl, aryl, benzyl or phenylethyl, and $R_1$ has the meaning of $R_2$ or is $COOR_2$ or $CONHR_2$.

Examples of radicals KK of the pyridone series are those of formula

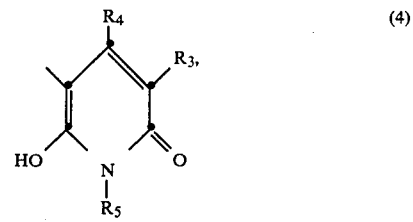

wherein $R_3$ is alkyl, CN, $CONH_2$ or $SO_2NH_2$, $R_4$ is alkyl and $R_5$ is hydrogen, alkenyl, aryl or preferably, unsubstituted or substituted $C_1$-$C_8$ alkyl.

Alkyl groups by themselves or as moieties of other substituents and referred to in the foregoing definitions as being unsubstituted or substituted, may carry as possible substituents, unless otherwise indicated, for example: hydroxy, cyano, halogen (e.g. chlorine or bromine), $C_1$-$C_4$alkoxy, phenoxy or phenyl (both unsubstituted or substituted by 1 to 3 members selected from the group consisting of halogen, methyl and methoxy), amino, alkylamino or dialkylamino. The alkyl groups by themselves or as moieties of other substituents contain preferably 1 to 8, most preferably 1 to 4, carbon atoms, while alkenyl groups contain preferably 2 to 8, most preferably 2 to 4, carbon atoms, and cycloalkyl groups contain preferably 5 or 6 carbon atoms.

By aryl is meant preferably naphthyl and, most preferably, phenyl, which is unsubstituted or substituted e.g. by $C_1$-$C_4$alkyl, $C_1$-$C_4$alkoxy or halogen.

The most preferred coupling components KK are 1-phenyl-3-methylpyrazol-5-one and 1-ethyl-3-cyano-4-methy-6-hydroxypyrid-2-one.

The coupling components are known.

A further object of the present invention is a process for the preparation of mixtures comprising 75 to 99% by weight of a dye of formula

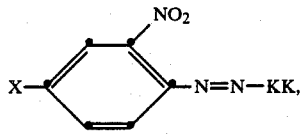

wherein
X is hydrogen, chlorine, bromine or methyl, and
KK is the radical of a coupling component that does not contain water solubilising groups,
and 1 to 25% by weight of a dye of formula

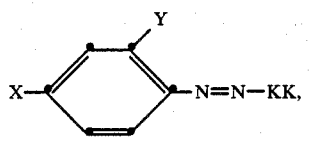

wherein X and KK have the given meanings and Y is chlorine or bromine, which process comprises diazotising an amine of formula

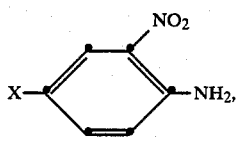

in an aqueous hydrohalic acid of formula HY, then, after addition of further hydrohalic acid HY, carrying out an aftertreatment at 20° to 50° C. for 0.5 to 10 hours, and finally coupling the solution of the diazonium salt to a coupling component H-KK.

The diazotisation and coupling reactions can be carried out by conventional methods, e.g. as described in Ullmann's Enzyklopädie der technischen Chemie, Vol. 5 (1954), page 783 et seq. For example, the diazotisation of the amine of formula (5) is effected with an alkali metal nitrite, e.g. with sodium nitrite, in acid medium. The diazotiosation is conveniently carried out in the temperature range from −10° to +40° C., e.g. from room temperature (∼15° C.) to 35° C.

After the diazotisation, further hydrohalic acid HY is added, preferably 0.5 mole to 3 moles, most preferably 0.5 to 1 mole, per mole of diazonium salt, and an aftertreatment is carried out. This aftertreatment comprises e.g. shaking or stirring the solution of the diazonium salt at 20° to 50° C., preferably at 25° to 45° C., for 0.5 to 10 hours, preferably for 1 to 6 hours. The solution of the diazonium salt is then coupled to a coupling component KK. In the course of the aftertreatment, partial replacement of the nitro group by halogen takes place. This exchange also takes place to a lesser degree during slow diazotisation.

The coupling of the diazotised amine to the coupling component is also effected in known manner, for example in acid, aqueous or aqueous-organic medium, conveniently in the temperature range from −10° to +30° C., preferably below 10° C. Examples of suitable acids are hydrochloric acid, acetic acid, sulfuric acid or phosphoric acid. Diazotisation and coupling can also be carried out e.g. utilising a single vessel for both steps, i.e. in the same reaction medium. The resultant dye mixture is subsequently worked up in conventional manner.

A further method of preparing the dye mixtures of this invention comprises mixing or fusing the dyes of formulae (1) and (2) together. It is advantageous to add a dispersant to the mixture, e.g. an anionic or nonionic dispersant, as well as water, and to grind the mixture with grinding assistants (e.g. glass balls) to give a ready for use dispersion.

Alternatively, it is also possible e.g. to grind the individual components (individual dyes) in the above described manner with a dispersant and water and then to mix the resultant dispersions, thus also affording ready for use dispersions of the dye mixtures of this invention.

Anionic dispersants suitable for the above method are, for example, condensates of naphthalenesulfonic acid and formaldehyde, preferably dinaphthalenemethane disulfonates or modified ligninsulfonates. Examples of nonionic dispersants are adducts of about 3 to 40 moles of ethylene oxide with alkylphenols, fatty alcohols or fatty amines.

If the individual dyes are mixed by fusing them together, they are fused to a homogeneous melt, which is then cooled and ground with the optional addition of an anionic or nonionic dispersant, as described above. Ready for use dispersions of the dye mixtures of this invention are also obtained in this manner.

The dye mixtures of the present invention are used for dyeing and printing disperse dyeable textile materials. Prior to use, the dye mixtures are preferably converted into dye formulations, if this has not already been done during the preparation of the mixtures. To this end they can be comminuted to an average particle size between 0.01 and 10 um. Comminution can be effected in the presence of a dispersant. For example, the dried dye mixture is ground with a dispersant or kneaded in paste form with a dispersant and then vacuum dried or spray dried. After addition of water, the formulations so obtained can be used for dyeing, padding or printing in long liquor (liquor to goods ratio greater than 1:5) or in a short liquor (liquor to goods ratio 1:1 to 1:5).

The novel dye mixtures exhaust extremely well from an aqueous suspension or dispersion on to textile materials made from manmade or regenerated high molecular materials. They are especially suitable for dyeing, padding or printing fibres, filaments or webs, woven or knitted fabrics, especially fibres made from linear aromatic polyesters. These are usually polycondensates of terephthalic acid and glycols, especially ethylene glycol, or polycondensates of terephthalic acid and 1,4-bis(hydroxymethyl)-hexahydrobenzene.

The polyester fibres are dyed e.g. by known methods in the presence of carriers in the temperature range from about 80° to 125° C., or in the absence of carriers under pressure in the temperature range from about 100° to 140° C. by the exhaust process. These fibres can also be padded or printed with the aqueous dispersions of the dye mixtures and the impregnated fabric fixed in the temperature range from about 140° to 230° C., e.g. with steam, contact heat or hot air.

Usually the conventional dispersants specified above are added, preferably anionic or nonionic dispersants, which may also be used in admixture with one another.

Conventional thickeners may be used for padding and printing. Examples of such thickeners are modified or unmodified natural products, e.g. alginates, British gum, gum arabic, crystal gum, locust bean gum, tragacanth, carboxymethylcellulose, hydroxyethylcellulose, starch or synthetic products, for example polyacrylamides or polyvinyl alcohols.

In the following Examples parts and percentages are by weight, unless otherwise stated.

EXAMPLE 1

74 parts by volume of aqueous 10 N hydrochloric acid are added to 43.2 parts of 4-chloro-2-nitroaniline in 120 parts of water. Then 0.3 part by volume of a conventional wetting agent is added and the mixture is stirred for 1 hour at room temperature. Diazotisation is then carried out at increasing temperature over 20 minutes by uniform addition of a total of 63 parts by volume of aqueous 4 N sodium nitrite solution. During the diazotisation, the temperature of the reaction mixture rises to 30°–33° C. Then 25 parts by volume of aqueous 10 N hydrochloric acid are added and the batch is stirred for 5 hours at 40° C. in a water bath. After clarification with 5 g of diatomaceous earth, a yellow solution of the diazonum salt mixture is obtained. This solution is added uniformly at 20°–25° C. over 30 minutes to a solution of 250 parts by volume of water, 25 parts by volume of aqueous 10 N sodium hydroxide solution and 45.4 parts by weight of 3-cyano-1-ethyl-6-hydroxy-4-methylpyrid-2-one.

After addition of the diazo solution, the pH is adjusted to 4.5–5 over 30 minutes with c. 43 to 45 parts by volume of aqueous 10 N sodium hydroxide solution to bring the coupling to completion and the reaction mixture is stirred for 30 minutes. The coupling is complete when no more violet dye is formed with a solution of H-acid made alkaline with sodium carbonate.

The yellow suspension is then heated to 95° C. and stirred for 2 hours at this temperature. After cooling to 50° C., the dye is isolated by filtration, washed free of salt with hot water, and dried to constant weight at 80° C. in a vacuum drying cabinet.

Yield: 85 to 87 g of a pale beige powder of formula

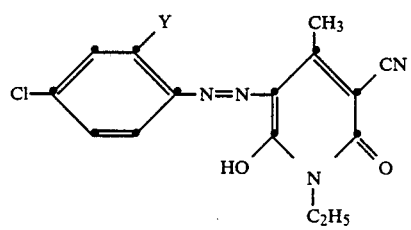

Y=90% $NO_2$ and 10% Cl which, after working up, dyes polyester in a brilliant yellow shade and exhibits catalytic fading only within the limits of tolerance.

EXAMPLE 2

The solution of the diazonium salt mixture described in Example 1 is added uniformly at 15°–20° C. over 20 minutes to a solution of 100 parts of water, 25 parts by volume of aqueous 10 N sodium hydroxide solution and 43.6 parts of 1-phenyl-3-methylpyrazol-5-one.

To bring the coupling to completion, the pH is adjusted to 4–4.5 with c. 36 parts by volume of aqueous 10 N sodium hydroxide solution over 30 minutes and the reaction mixture is stirred for 30 minutes. The coupling is complete when no more violet dye is formed with a solution of H-acid made alkaline with sodium carbonate.

The yellow suspension is then heated to 90° C. and stirred for 1 hour at this temperature. After cooling to 60° C., the dye of formula

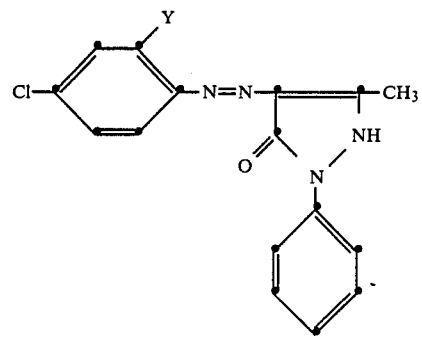

Y=90% $NO_2$ and 10% Cl is isolated by filtration, washed free of salt with hot water, and dried to constant weight at 80° C. in a vacuum drying cabinet.

Yield: 76–78 g of an orange powder which, after working up, dyes polyester in a reddish yellow shade.

EXAMPLES 3–7

The procedure of Example 1 is repeated, using the diazo components listed in column 2 of the following table and the coupling components listed in column 3, to give the azo dyes listed in column 4. Y denotes a mixture of 75–99% of $NO_2$ and 25 to 1% of Cl.

| Example | Diazo component | Coupling component | Dye (Y = mixture of NO$_2$ and Cl) |
|---|---|---|---|
| 3 | 2-nitro-aniline | 3-cyano-1-ethyl-6-hydroxy-4-methyl-pyrid-2-one | ![structure] |
| 4 | 4-bromo-2-nitro-aniline | 3-cyano-1-ethyl-6-hydroxy-4-methyl-pyrid-2-one | ![structure] |
| 5 | 2-nitro-aniline | 1-isopropoxypropyl-3-cyano-4-methyl-6-hydroxypyrid-2-one | ![structure] |
| 6 | 2-nitro-aniline | 1-phenyl-3-methyl-pyrazol-5-one | ![structure] |
| 7 | 4-bromo-2-nitro-aniline | 1-phenyl-3-methyl-pyrazol-5-one | ![structure] |

EXAMPLE 8

The procedure of Example 1 is repeated, adding after the diazotisation only 6.4 parts by volume of aqueous 10 N hydrochloric acid instead of 25 parts by volume, to give a dye mixture of the formula indicated in Example 1, wherein Y=67% of NO$_2$ and 33% of Cl.

What is claimed is:

1. A mixture comprising 75 to 99% by weight of a dye of formula

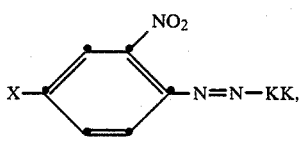

(1)

wherein

X is hydrogen, chlorine, bromine or methyl, and
KK is the radical of a coupling component that does not contain water solubilising groups, and 1 to 25% by weight of a dye of formula

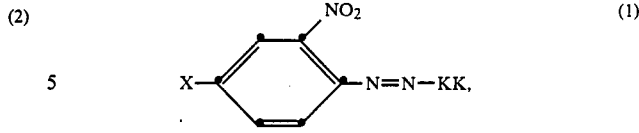

wherein
X is hydrogen, chlorine, bromine or methyl, and
KK is the radical of a coupling component that does not contain water solubilising groups,
and 1 to 25% by weight of a dye of formula

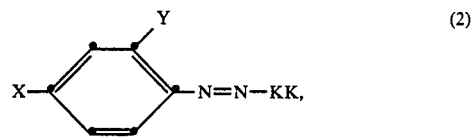

wherein X and KK have the given meanings and Y is chlorine or bromine, which process comprises diazotising an amine of formula

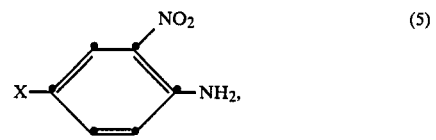

in an aqueous hydrohalic acid of formula HY, then, after addition of further hydrohalic acid HY, carrying out an aftertreatment at 20° to 50° C. for 0.5 to 10 hours, and finally coupling the solution of the diazonium salt to a coupling component H-KK.

10. A process according to claim 9, wherein diazotisation is carried out in the temperature range from −10° to +40° C.

11. A process according to claim 10, wherein 0.5 mole to 3 moles, of a hydrohalic acid, is added after the diazotisation.

12. A process according to claim 11, wherein an aftertreatment is carried out in the temperature range from 20° to 50° C.

13. A process according to claim 12, wherein the aftertreatment is carried out for 1 to 6 hours.

14. An aqueous dye dispersion which contains a dye mixture as defined in of claim 1 and at least one anionic or nonionic dispersant.

15. A process for dyeing or printing textile materials made from manmade or regenerated fibres, which comprises applying to said materials a dye mixture as defined in claim 1.

16. A process according to claim 15 for dyeing or printing polyester materials.

17. A process according to claim 16, wherein the materials to be dyed are treated in an aqueous dispersion of the dye mixture by the exhaust process.

18. Textile material dyed or printed by a process as claimed in claim 17.

19. A process according to claim 12, wherein said temperature range is 25° to 45° C.

20. A mixture according to claim 6 wherein KK is the radical of 1-phenyl-3-methylpyrazol-5-one or 1-ethyl-3-cyano-4-methyl-6-hydroxypyrid-2-one.

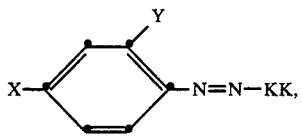

wherein X and KK have the given meanings and Y is chlorine or bromine

2. A mixture according to claim 1, comprising 85 to 95% by weight of a dye of formula (1) and 5 to 15% by weight of a dye of formula (2).

3. A mixture according to either claim 1, wherein X is hydrogen or, chlorine.

4. A mixture according to claim 1, wherein KK is the radical of a coupling component of the series of acylacetarylamides, phenols, pyridones, quinolines, pyrazoles, indoles, diphenylamines, anilines, aminopyridines, pyrimidines, pyrimidones, naphthols, naphthylamines, aminothiazoles, thiophenes or hydroxypyridines.

5. A mixture according to claim 4, wherein KK is the radical of the series of acetoacetanilides, phenols, anilines, diphenylamines, naphthylamines, naphthols, indoles, quinolines, pyridones, pyrazoles, quinolones, aminopyridines, especially 2,6-diaminopyridines.

6. A mixture according to claim 3, wherein KK is a radical of formula

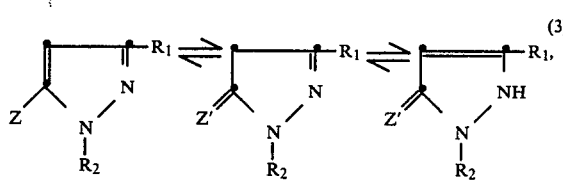

wherein Z is OH or $NH_2$, Z' is O or NH, $R_2$ is H, $C_1$-$C_4$alkyl, alkenyl, cycloalkyl, aryl, benzyl or phenylethyl, and $R_1$ has the meaning of $R_2$ or is $COOR_2$ or $CONHR_2$.

7. A mixture according to claim 5, wherein KK is a radical of formula

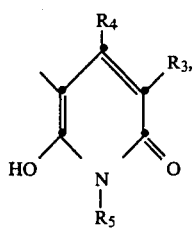

wherein $R_3$ is alkyl, CN, $CONH_2$ or $SO_2NH_2$, $R_4$ is alkyl and $R_5$ is hydrogen, alkenyl, aryl or, unsubstituted or substituted $C_1$-$C_8$alkyl.

8. A mixture according to claim 7, wherein KK is the radical of 1-phenyl-3-methylpyrazol-5-one or 1-ethyl-3-cyano-4-methyl-6-hydroxypyrid-2-one.

9. A process for the preparation of a mixture comprising 75 to 99% by weight of a dye of formula